Oct. 10, 1939.   W. H. FRICK   2,175,629
GAS RANGE
Filed Oct. 23, 1936   6 Sheets-Sheet 1

FIG. 1.

Inventor
W. H. Frick
By Patterson, Wright and Patterson
Attorneys

Patented Oct. 10, 1939

2,175,629

UNITED STATES PATENT OFFICE 2,175,629

GAS RANGE

William H. Frick, Cleveland, Ohio, assignor to American Stove Company, St. Louis, Mo., a corporation of New Jersey Application October 23, 1936, Serial No. 107,285

9 Claims. (Cl. 126—39)

This invention pertains to gas ranges and is directed more particularly and specifically to solid or closed top gas ranges of the heavy duty type such as are more commonly used in hotels, restaurants, hospitals or other like establishments where cooking on a large scale or in a large volume is done, and where a range is in operation throughout the major portion of a day so that food can be provided on short notice.

Solid or closed top cooking ranges are not broadly new nor are heavy duty cooking ranges broadly new, and as a consequence the present invention is directed to certain particular improvements in cooking ranges of this character, and one of the primary objects of the present invention is the provision of such a range in which the cooking top can be heated uniformly throughout its entire area.

Another and further object of the invention is the provision of a closed top heavy duty cooking range which is constructed to provide a range composed of a plurality of units which may be operated simultaneously or independently of one another and in which it is possible to either uniformly heat the entire cooking top or to heat different areas of the cooking top to different degrees of temperature whereby different portions of the cooking top may be extremely hot, medium hot or only comparatively warm so that fast, medium and slow cooking can be obtained on a single solid top cooking range.

In the use of heavy duty ranges and particularly in commercial establishments, it is sometimes found desirable to carry on the cooking directly on the cooking top plate, such as frying or broiling meats and the cooking of hot cakes. When cooking of this kind is done the cooking top plate has its upper surface polished and therefore one of the objects of the present invention is the provision of a cooking range of the solid top type which is particularly designed for cooking directly on the cooking top surface. In the range which I have provided a special construction has been incorporated whereby the grease used on the cooking top to facilitate the cooking will automatically drain from the top to a point of collection.

In providing a range having the above attributes an improved combustion chamber construction has been achieved and an improved burner arrangement is provided. Additionally an improved manner of supplying secondary air to the burners is provided and a sectional solid or closed cooking top having a new and improved construction is provided and utilized.

Numerous other improved constructional features of the range and advantages of the range will appear in more detail from the following description when read in the light of the accompanying drawings which illustrate a preferred embodiment of the present invention.

Having reference now to the drawings:

Figs. 2 and 2a are a vertical sectional view through the range illustrated in Fig. 1 of the drawings, the section being taken transverse the range.

Fig. 3 is a fragmentary vertical sectional view taken at right angles to Figs. 2—2a, or longitudinally through the range.

Figs. 4 and 4a are vertical sectional views taken longitudinally through a modified form of the invention.

Fig. 6 is a fragmentary vertical sectional view taken transverse through a range which is a still further modification of the range appearing in Figs. 4—4a.

Figure 1:
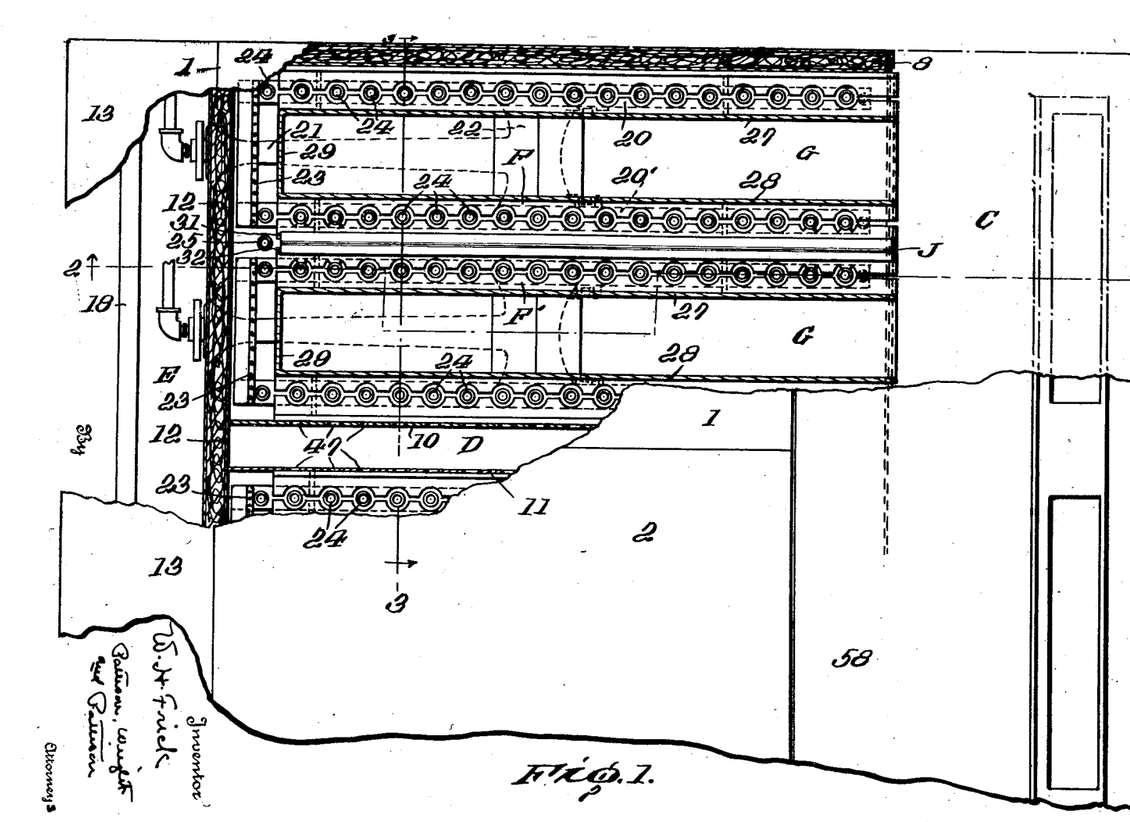
Fig. 1 is a fragmentary top plan view of the cooking range, a portion of the view being broken away and appearing in horizontal section.
Figure 2:
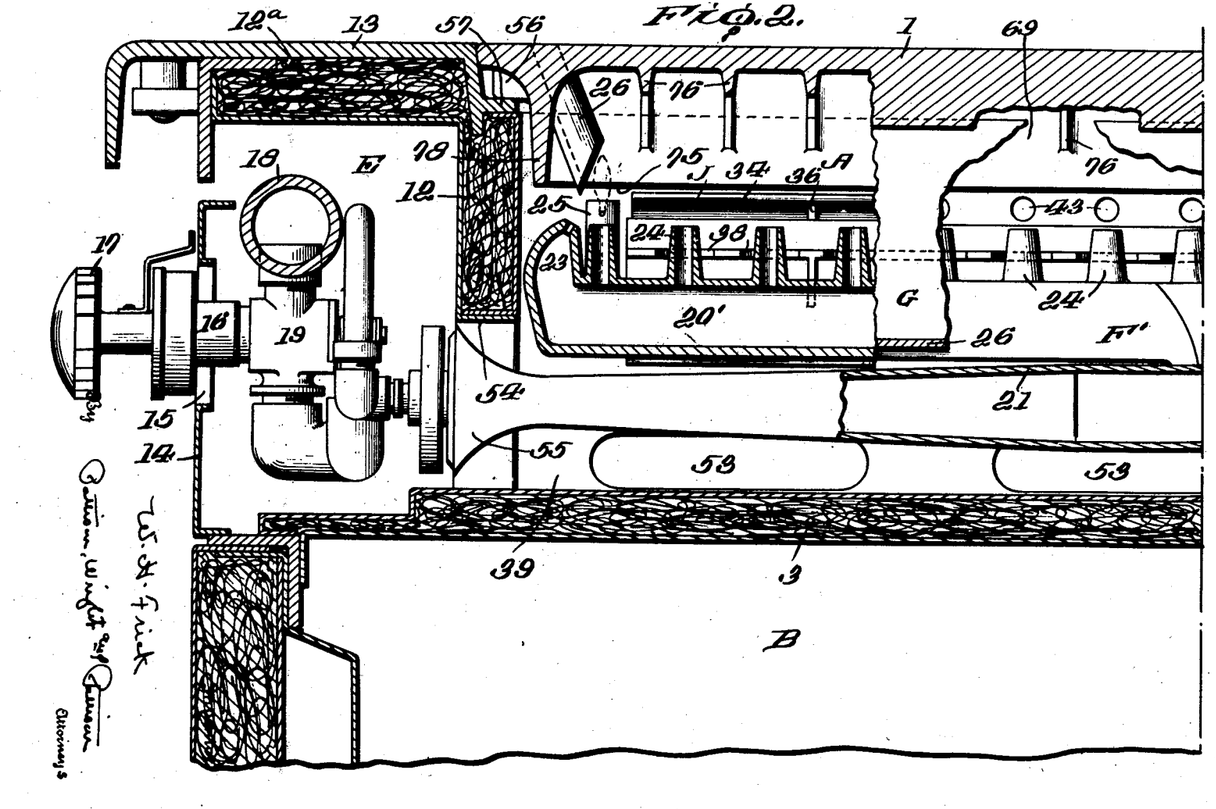

Referring now to the drawings and particularly to Figs. 1 to 3 inclusive, 1 and 2 designate plates which constitute the solid cooking top portion of the range. Beneath each plate there is a combustion chamber A. When a thirty-two inch range is desired there will be two combustion chambers and two cooking top plates. If a forty-eight inch range is desired there will be three combustion chambers and three cooking top plates. It will of course be understood and be readily apparent from the drawings that the cooking top plates have abutting edges and are supported in alignment with each other to provide a smooth solid cooking top.

Inasmuch as each of the cooking top plates are of similar construction and each of the burner chambers, including the burners therein and the baffles therefor, are of similar construction description of a single combustion chamber or unit of the range will suffice as a description of a range made up of a plurality of such sections.

Beneath all of the combustion chambers and extending throughout the entire length of the range is a chamber or space B which may be suitably sub-divided to provide a plurality of broiling or baking ovens. As this portion of the range forms no part of the present invention specific description or illustration of it is not made. The fully insulated top or upper end 3 of this chamber constitutes the bottom for all of the combustion chambers.

The rear wall of all of the combustion chambers is formed by the upwardly extending end 4 of the rear wall 5 of the compartment B taken together with the bottom wall 6 and rear wall 7 of the outlet flue box C which extends completely across the rear end of the range.

The combustion chambers at the end of the range are closed at one side by the fully insulated side walls 8 constituting a continuation of the end walls 9 of the chamber B. The interior sides of the end combustion chambers are formed by the vertically disposed and longitudinally extending walls 10 and 11 of the secondary air conduit D. It is to be readily understood and thought to be obvious that where a two-unit range having two combustion chambers is desired there will be between the combustion chambers a secondary air conduit D, whereas in a three-unit range there will be two such secondary air conduits one of which is disposed at each side of the centrally disposed combustion chamber.

A fully insulated front wall 12 extends entirely across the front end of the range and constitutes the front closure wall for all of the combustion chambers. This wall 12 is inset from the front edge of the range and constitutes the rear wall of the gas manifold and the valve housing E.

A top plate extension 13 comprises the top of the housing E and is fully insulated at its under side by an extending portion 12a of the wall 12. The front of this housing is closed by a removable panel 14 having therein a plurality of openings 15 for the passage of the hub portions 16 of the valve setting handles 17.

The main gas supply manifold is designated at 18 and throughout its length is periodically provided with a valve 19 for controlling the delivery of gas to a pair of burners F and F' which comprise the heating unit of each combustion chamber. Thus although each combustion chamber is provided with two burners the gas supply to them is under the control of a single valve.

Each of the burners is of an H-shape and comprises a pair of burner arms 20 and 20' disposed in parallel separated relation and extending from adjacent the front end of the combustion chamber to a point adjacent the lower rear wall 4 of the combustion chamber. Each burner is fed from a centrally disposed and longitudinally extending burner manifold 21 which at its rear end has a cross arm 22 connected with each burner arm at a point approximately intermediate its ends.

At their forward ends the arms of each burner are connected by a transversely extending burner arm 23 and each of the longitudinally extending burner arms are provided with a plurality of burner orifices 24 arranged in separated parallel relationship throughout the lengths of the arms.

At a point intermediate each of the main burners in each of the combustion chambers a pilot light 25 is provided and can be ignited from the upper side of the cooking top plate of the range through the medium of the lighter tube 25'.

Extending throughout the length of each burner and positioned in the space intermediate the burner arms thereof is a U-shaped or trough-like baffle G the bottom 26 of which is disposed well above the bottom of the burner chamber while its side walls 27 and 28 are vertically disposed and extend in parallelism to the upwardly extending burner jets or orifices of the burner arms and terminate at a point well above those jets but in separated relationship to the under sides of the cooking top plates. The front ends of these trough-like baffles are closed by a front wall 29 while the rear ends of the troughs are open for free communication with the flue box C at the rear of the range. Periodically throughout their lengths this baffle trough is provided with shoulders 30 which have supporting engagement with the burner arms.

By reference to the drawings it will be seen that inasmuch as each combustion chamber is provided with two burners there are consequently in each combustion chamber two of these U-shaped or trough-like baffles.

In the space intermediate the baffles G and particularly in the space intermediate the adjacent and parallel burner arms of the two burners, I provide a secondary air inlet slot H which is formed by longitudinally extending walls 31 and 32 which are disposed in separated relationship and extend throughout the lengths of the burner arms. These walls are disposed at a slight angle to one another so that at their lower ends the slot opening 33 is of smaller or less width than it is at its upper end. In the upper end of the slot there is disposed a Y-shaped baffle J, the obliquely extending arms 34 and 35 of which are supported above and in separated relationship to the upper end of the slot opening by suitable fins 36 which are periodically disposed throughout the length of the under side of the baffle. It will be evident that secondary air traveling upward through the slot will by the baffle J be deflected outwardly to supply air to each of the adjacent burner arms at a point slightly above the burner orifices or jets of said burner arms.

The construction making up this secondary air delivery slot is supported upon the adjacent burner arms through the instrumentality of fins 37 which are periodically disposed throughout the lengths of the side walls 31 and 32 of the slot.

The burner trough G and the slot construction H adjacent the burner orifices are notched as at 38 to provide a secondary air inlet opening around each of the burner jets.

At that side of the burner chamber adjacent the outer end wall 8 of the range a supplemental side wall 39 is provided and is disposed in separated parallel relation to the wall 8 to provide a secondary air conduit 40 the lower end 41 of which is open to the atmosphere while its upper end is closed as indicated at 46. At a point above the burner orifices of the adjacent burner arm this wall 39 is provided with a secondary air inlet opening 43 and immediately below this opening there is provided an L-shaped baffle 44 having at periodic points throughout its length notched-out portions 45 to provide in combination with the notched-out portions 38 of the wall 27 of the trough baffle G secondary air inlet openings around each of the burner jets. This L-shaped baffle at its under side is provided at a plurality of separated points throughout its length with downwardly extending fins 46 provided with shoulders having supporting engagement with the burner arm 20.

At the opposite edge or side of the combustion chamber a similar L-shaped baffle 44 is provided and is disposed immediately beneath the secondary air inlet openings 47 which are provided in the side wall 10 of the secondary air conduit D at points opposite each of the burner jets 24.

Describing the secondary air conduits D in detail it will be seen that the walls 10 and 11 at their lower ends are bent outwardly as at 48 for supporting engagement with the bottom 3 of the combustion chamber and that the bottom of the combustion chamber forms the bottom of the conduit. The upper ends of the walls 10 and 11 are bent inwardly to form a top closure 49 for the secondary air conduit. The front walls 12 of the combustion chambers forms a front closure wall for the air conduit but the rear end of the conduit is supplied with air through a suitable opening 50 provided in the rear wall portion 4 of the combustion chamber. At a plurality of separated points throughout their lengths and adjacent their lower ends the conduit walls 10 and 11 are provided with secondary air outlet openings 51 which communicate with the adjacent combustion chambers at a point below the burners.

Secondary air is also admitted to the bottom of the combustion chamber at a point well below the burners by suitable elongated secondary air inlet openings 53 in the lower end of the supplemental side wall 39 at the ends of the range.

Secondary air is also admitted to the lower front ends of the combustion chambers at a point beneath the burners. This secondary air enters through the opening 15 Fig. 4 in the front panel 14 of the manifold chamber E and passes through that chamber and into the lower front end of the combustion chamber through the opening 54 which is povided in the wall 12 for the reception of the mixing bells 55 of the burner mixing tubes. This opening 54 is larger than the bells and this permits the passage of secondary air around the bells into the lower front ends of the combustion chamber.

Specific description will now be given of the construction of the cooking top plates. By reference to Fig. 3 of the drawings it will be apparent that an individual cooking top plate is provided for each combustion chamber or each range unit. At their front edges these plates are provided at their under side with shoulders 56 Fig. 2 which have supporting engagement with a shoulder 57 formed as a part of the top plate 13 of the manifold housing. The top plate 13 extends throughout the length of the range and the shoulder 7 has a similar length. At its rear edge and extending throughout its length the range is provided with a rear plate 58 which forms the top of the flue box C and extends sufficiently well forward to overhang to some extent the rear ends of the combustion chambers and the rear ends of the burners therein. This plate is provided with a shoulder 59 which extends throughout the length of the rear end of the range and constitutes a support for the rear ends of the cooking top plates, as is clearly apparent at 60 in Fig. 2a of the drawings. The outer longitudinal edges of the cooking top plates have supporting engagement at 61 and 62 with the L-shaped angle iron 63 disposed upon the tops of the end walls 8 Fig. 3 of the range while the inner longitudinal edges of the cooking top plates have supporting engagement as at 64 and 65 with the two angle irons 66 and 67 which are arranged in back to back relation and carried by the upper ends 49 of the secondary air conduits D.

The manner in which the cooking top plates are supported having been described particular description will now be given of the plates themselves. Adjacent their longitudinal edges and extending throughout their lengths these plates are provided at their under sides with greatly thickened portions 68 Fig. 3 above the wall 8 which at their lower extremities have downwardly extending fins 69 which are disposed in separated parallel relationship to the supplemental end or side wall 39 of the combustion chamber and the side walls 10 and 11 of the secondary air conduit respectively. Each of these thickened portions of the cooking top plates are disposed immediately above a burner arm and the flames burned at the burner orifices thereof will impinge directly upon them. These thickened portions have a curved edge 70 which will tend to cause the flames to travel towards the center of the combustion chamber. At a plurality of separated points throughout the lengths of the thickened portions fins 71 are provided which extend at right angles to the fins 69 and these fins will in a sense form above each burner orifice a pocket-like formation having an open end facing the interior or central portion of the combustion chamber.

Immediately above each of the trough-like baffles each of the plates is provided with a slightly thickened portion 72 which extends throughout the length of the plate and merges into a downwardly extending fin 73 the lower end of which extends slightly into the trough.

Each of the plates 1 centrally is provided with a thickened portion 74 Fig. 3 which extends throughout the length of the plate and is provided with a downwardly extending fin 75 the lower end of which terminates slightly above the centrally depressed portion of the Y-shaped baffle J. At each side of the fin 75 and extending at right angles thereto and at a plurality of points in separated relationship throughout the length of this fin are provided supplemental fins 76. These fins 76 provide above each of the burner orifices of the burner arms at each side of the secondary air inlet slot H pocket-like formations into which will enter the flames burned at the burner orifices. These flames will impinge upon the thickened portion 74 of the plates and due to the curved or arc-like contour of the thickened portion as indicated at 77 the flames will be deflected away from the longitudinally disposed fin 75 and towards and above the trough-like baffles G so as to deliver heat to the thinner portions of the cooking top plates which are disposed above said troughs.

In addition to the fins thus far described as being carried by the under sides of the cooking top plates, the plates are further provided adjacent their front edges with a downwardly extending fin 78 which is disposed in separated parallel relationship to the front wall 12 of the combustion chamber and forms a connection between the front ends of the aforementioned fins 69 which extend along the longitudinal edges of the plate. The fins 71 provide inwardly extending pockets and the fins 76 provide oppositely extending pockets.

Considering the range construction thus far described it will be understood that all the downwardly extending fins at the under sides of the cooking top plates tend to strengthen the plates and at the same time operate as heat absorption members. Strengthening of the plates to guard against the possibility of their becoming warped is of course highly advantageous and desirable.

When the range is in operation the flames burned at the plurality of burner orifices will directly impinge upon the thickened portions of the top plates and due to the curved outline of these plate portions the flames will tend to curl inwardly towards the thinner portions of the plate and the heat generated by the burners will tend to be directed against the thinner portions of the plates which portions are remote to the burners. By thickening those portions of the plates against which the flames impinge localized overheating of the plates is prevented and inward deflection of the flames' heat enables the heating of the remoter thinner portions of the plates.

It will be evident that the hot products of combustion will be directed towards and into the trough-like channelways G which have their front ends closed by walls 29 so that said products of combustion will flow inwardly therein and in their outward passage through the combustion chamber will heat the thinner portions of the plates throughout their lengths. The fins 73 will prevent any possibility of impingement of the flames burned at the orifices of one burner arm with the flames burned at the orifices of the other burner arm. These fins additionally will serve to assure the direction of the hot products of combustion into the trough-like channelways where the draft at the rear end of the range will cause these products to move rearwardly under the thinner portions of the range to discharge through the flue box at the back of the range.

Secondary air in adequate and proper amounts properly fed is assured by reason of the construction provided. Provision of secondary air to the combustion chambers below the burners is assured through the secondary air inlet openings 51, 52 and 53 at the rear and sides of the lower end of the combustion chamber and to the front lower end of the combustion chamber through the openings 54 surrounding the burner manifold mixing tubes 55. The secondary air thus provided to the bottoms of the combustion chambers passes upwardly around the burners and past the burner orifices on its travel into the upper portions of the combustion chambers. Air which enters the rear openings 50 in the secondary air conduits D Fig. 4a is fed into the combustion chambers at a point above the burners through the openings 47 and secondary air is similarly fed into the upper end of the combustion chambers above the burner orifices through the openings 43 Fig. 3 of the secondary air channelways 40 in the side or end walls of the range. Secondary air is also fed to the upper end of the combustion chamber and above the burner orifices of the adjacent burner arms through the secondary air slot H Fig. 3 and this incoming secondary air is equally divided and properly directed to the adjacent burner orifices by the Y-shaped baffle J.

The vertical walls 27 and 28 of the trough channel-ways G extend sufficiently far above the adjacent burner orifices as to assure that the hot products of combustion and the flames travel vertically for impingement against the thickened portions of the cooking top plates and to further assure that neither these flames nor the burnt gases will strike back at the burner flames which would, if it occurred, tend to cause poor combustion. The downwardly and longitudinally extending fins 75 in conjunction with the secondary air inlet slots H and their baffles J serve as a sufficient division wall between the two burners in each combustion chamber as to assure that the flames burned at the adjacent and parallel burner arms of the two burners operate independently and without the possibility of detrimental interference one with the other. These portions taken together with the adjacent vertical side walls of the troughs G assure that the flames burned at each of the burner arms will travel vertically for impingement against the thickened and heavy central portions 74 of the cooking top plates.

A range constructed in the manner described will operate with high efficiency and satisfaction. Although the area of each cooking top plate is considerable in amount it has been found in practice that the plate will be heated uniformly at all points of its area. Additionally by the provision of a plurality of independent combustion chambers with an independent control of the fuel to the burners of each it has been found that the range can be operated in a manner whereby one of the cooking top plates is extremely hot while the remaining cooking top plates are medium hot and only comparatively warm, respectively, by merely properly adjusting the fuel delivery to the burners in the respective combustion chambers.

The range construction when carefully considered will be found to be one wherein in reality each longitudinally extending burner arm is positioned within a channelway having an open upper end and having in its bottom secondary air inlet openings which are arranged concentrically to the burner orifices of each of the burner arms. Thus each of the burners is in a channelway while intermediate each of the arms of each burner there is a second channelway formed by the trough G and this intermediate channelway is in a sense in turn centrally subdivided lengthwise by the downwardly extending fine 73 into a pair of channelways lying at each side of said fins.

From the foregoing description the modified forms of the invention, which will now be described, can be readily and easily understood due to the fact that their construction generally is quite similar.

Figure 4:
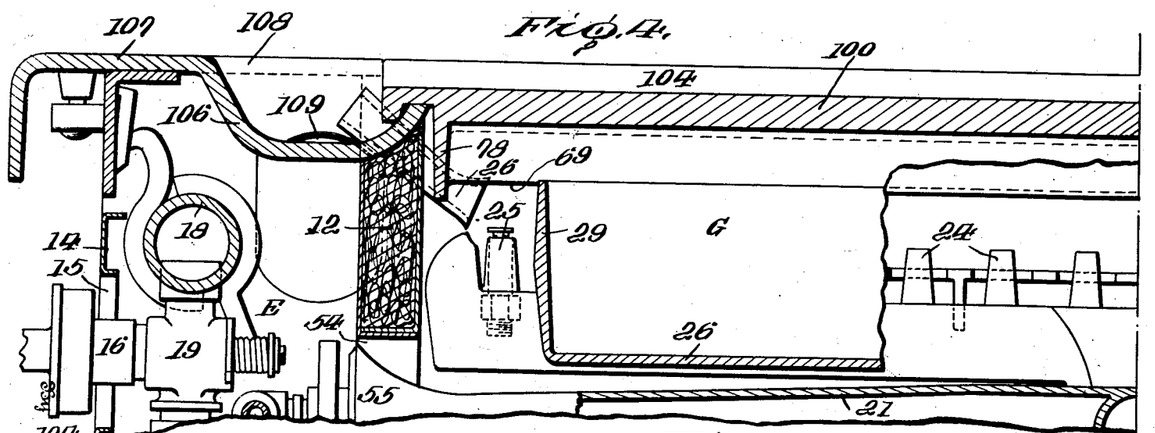
Figure 5:
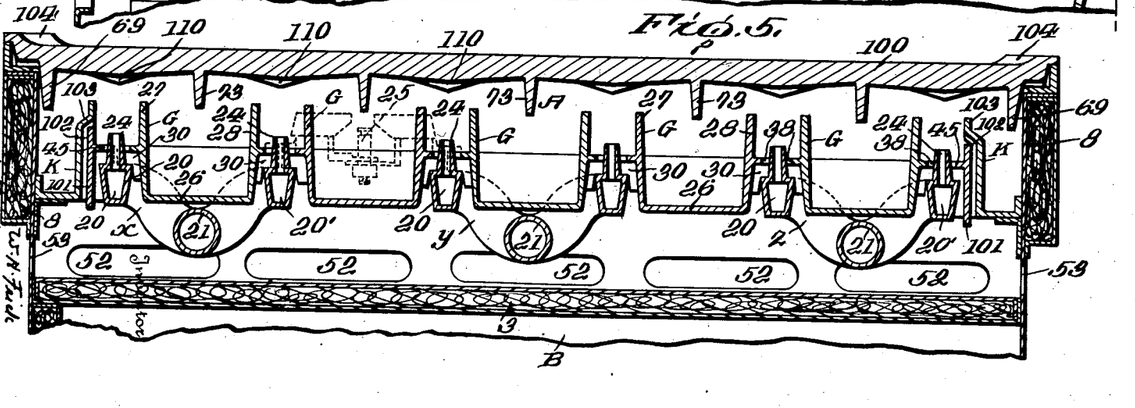
Fig. 5 is a vertical sectional view taken at right angles to Fig. 4, or transverse the range.

In Figs. 4, 4a and 5 of the drawings, a solid top cooking range designed for cooking directly upon the upper surfaces of the cooking top plate is illustrated. The range here illustrated is comparatively small as to width with the result that rather than using a plurality of parallel cooking top plates the upper end of the range is closed by a single plate 100. Due to the reduced width of the range, as compared with the width of the previously described form of range a single combustion chamber is utilized with the result that the secondary air conduits D appearing in the first described form of the invention are dispensed with.

The range combustion chamber as an entirety is designated at A and is defined by the range end or side walls 8; the range rear wall 4 in conjunction with the flue box C; the rear wall 12 of the manifold housing E; and the bottom 3 above the oven chamber or chambers B.

Just as in the preferred form of the invention a plurality of H-shaped burners are disposed within the combustion chambers and the elongated parallel burner arms of each of these burners is similarly designated by 20 and 20'. For the purpose of facilitating the description each of these burners made up of a pair of burner arms is given a separate reference character as X, Y and Z.

Just as has been described in respect to the preferred embodiment of the invention a trough-like channelway G is disposed between the burner arms of each burner and is of an extent similar to that of the arms. These channelways are supported on the burners in the manner which has been previously described so as to provide around each burner jet or orifice 24 a concentric secondary air inlet opening defined by the notches 38 of the channelways and the notches 45 in the T-shaped baffles 101 which are disposed adjacent but in separated parallel relationship to the longitudinally extending L-shaped baffles K at each side or end of the range. The space between the T-shaped baffles 101 and the L-shaped baffles K forms vertically extending channelways 102 for delivering secondary air from the lower end or bottom of the combustion chamber to the upper end of the combustion chamber at a point above the orifices. To assure the proper delivery of the secondary air carried by these channelways the baffles K at their upper ends are bent inwardly and upwardly as at 103.

As described in respect to the preferred form of the invention secondary air is admitted to the lower end of the combustion chamber beneath the burners and the trough-like channelways G through suitable openings 52 in the rear wall of the combustion chamber; 53 in the side walls of the range or combustion chamber; and the enlarged opening 54 which surrounds the mixing bell 55 of each of the burner mixer tubes 21.

As described in respect to the preferred form of the invention fuel to the burners is provided through a main manifold 18 while the fuel delivery to the burner arms making up each of the burners is under the control of a single gas valve 19.

The cooking top plate 100 has its upper surface polished and its upper surface throughout the length of its side or longitudinal edges is bulged upwardly as at 104 and throughout the length of its rear edge is similarly bulged upwardly as at 105 so that the plate at its upper side is of a pan or dish-like shape. The front edge however of the plate is not provided with a bulge with the consequence that any surplusage of grease used in the direct cooking of foods upon the top plate can drain into the trough 106 which is formed as a part of the manifold housing cover plate 107 and extends throughout the entire length of the front of the range and is closed at its end by suitable end walls 108. Grease, food, dirt or other like substances drain from this trough through a suitable pipe 109 and can be collected in any suitable receptacle provided for the collection of the same.

Just as in respect to the preferred form of the invention burner pilot lights 25 are positioned intermediate each of the burners and these lights can be ignited through the ignition tube 26.

At its under side and adjacent its longitudinal edges the plate is provided with longitudinally downwardly extending fins 69 similar to the heretofore described fins carrying the same numeral. The plate is further provided at its under side with a plurality of downward and longitudinally extending fins 73 similar to the fins previously described carrying the same numerals and similarly disposed in that they are centrally positioned above and extend throughout the lengths of the trough channelway G.

Immediately above each of the burner arms the under side of the cooking top plate is provided with a V-shaped longitudinally extending thickened portion 110 which receives direct flame impingement of the flames burned at the numerous burner jets of the numerous burner arms.

From the foregoing it will be seen that just as in respect to the preferred form of the invention the burner chamber construction and arrangement is such that secondary air in proper and adequate amounts is fed most advantageously to the burners and that the under side of the cooking top plate is constructed for the proper and most efficient distribution of the hot products of combustion so as to assure even cooking temperatures throughout the entire area of the cooking top plate. The advantages of the construction of this range and its improved mode of operation having been so fully pointed out in respect to the preferred embodiment of the invention, further description in respect to the modified form of the invention is not considered necessary.

Figure 6:
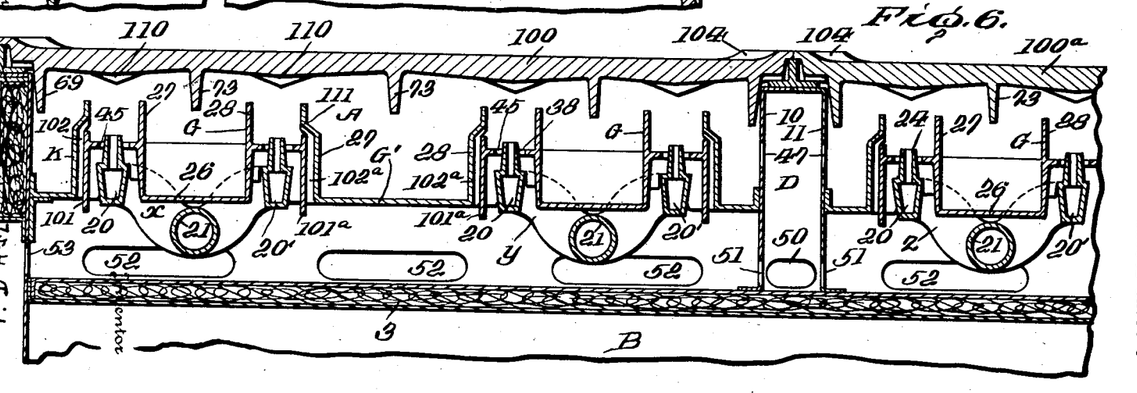
Figure 9:
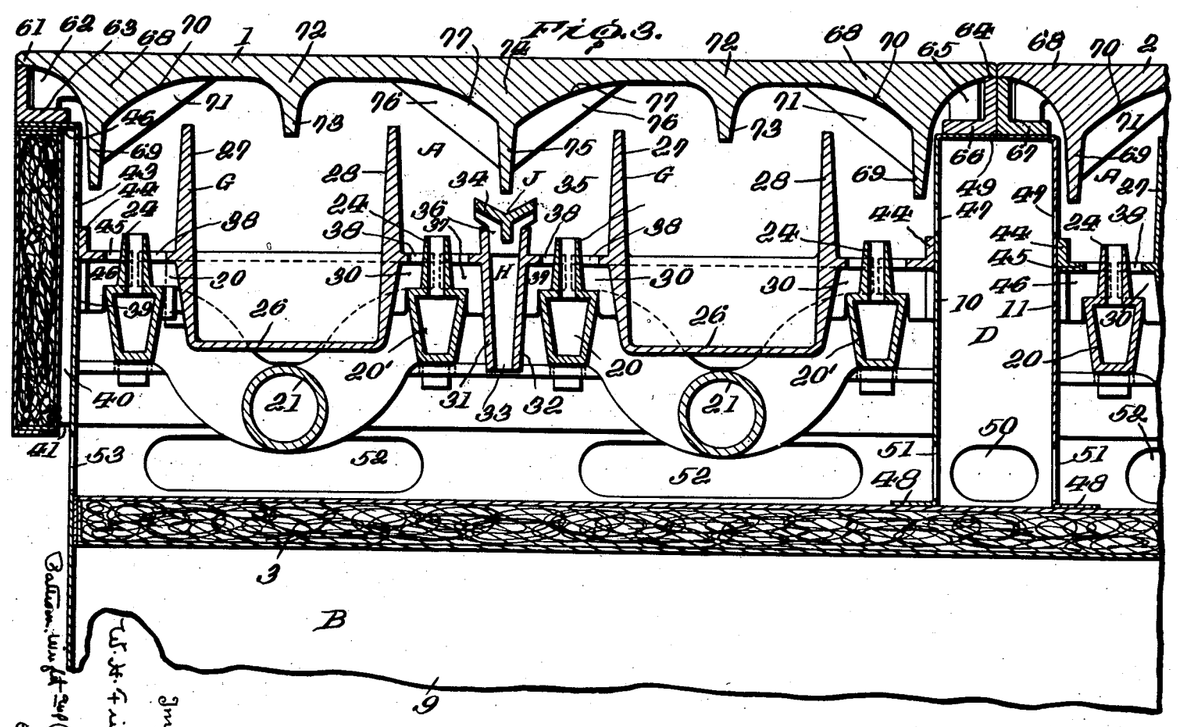

Fig. 6 of the drawings illustrates a range which is a slight modification over the range appearing in Figs. 4, 4a and 5. The range appearing in Fig. 6 is of a width greater than that appearing in Fig. 5 of the drawings and as a consequence a plurality of cooking top plates 100 are used rather than a single plate and are designated as 100 and 100ª. A sufficient number of these plates would be used to arrive at a range of a desired width. In this form of the invention I revert to the use of the secondary air conduits D and having the air inlet openings 50 in their rear ends and their air inlet openings 47 into the combustion chambers adjacent their upper ends thereof and their air inlet openings 51 into the bottoms of the combustion chambers beneath the burners and the trough-like channelways G.

The previously described T-shaped baffles 101 and L-shaped baffle K are utilized with the secondary air conduits 102 therebetween.

A slight further modification is incorporated in that the burners in each combustion chamber are spaced slightly further apart with the result that the center U-shaped conduit G' is wider than any thus far described and has the upper ends of its vertical walls 27 and 28 bulged outwardly as at 111. Additionally T-shaped baffles 101ª are provided to provide vertically extending secondary air conduits 102ª between the central trough channelway G' and the adjacent burner arms. The heretofore described concentric air inlet openings around each burner jet are provided through the notched portions 38 of the trough channelway and the notched portions 45 of the T-shaped baffles.

I claim:

1. In a range, a solid cooking top, a burner chamber therebeneath having a plurality of Bunsen burners therein, each burner having a pair of burner arms extending longitudinally of said burner chamber and in separated parallel relationship, a trough-like channelway disposed between the arms of each burner and forming in conjunction with the side walls of the burner chamber a housing having an open upper end and within which are disposed the outer arms of said burners, said troughs also forming a housing having an open upper end and within which are disposed the inner arms of said burners, a secondary air passageway having communication with the burner chamber beneath the burners and with the burner chamber above the burners disposed between the adjacent or inner arms of said burners, a downwardly and longitudinally extending fin carried by the under side of the cooking top immediately above said passageway and together with the conduit and the trough-like channelways forming individual housings for each of the adjacent or interior burner arms, a flue outlet at the rear end of the burner chamber, and communication between said trough-like channelways and said flue outlet, the parts operating as and for the purpose described.

2. A gas range having a closed cooking top, a combustion chamber beneath said top, an elongated trough within said combustion chamber extending toward but separated from the said top, said top having at its inner side downwardly elongated projections located at each side of said troughs, fins extending downwardly and towards the said troughs in a direction at right angles to the said projections said fins being separated to form pockets and burners located between said troughs and below said fins.

3. In a cooking range, a solid horizontally disposed cooking top and a burner chamber therebeneath, an outlet flue at one side of said chamber, a pair of elongated horizontally disposed burner arms in said chamber arranged in separated parallel relationship and extending towards said outlet flue, a horizontally disposed trough positioned between said burner arms and substantially coextensive therewith, the bottom of said trough being disposed a substantial distance beneath the burner orifices of said burner arms and the open top of said trough being closely adjacent but in separated relationship to the under side of said cooking top, the side walls of said trough extending a substantial distance above the burner orifices of said burner arms, a wall closing the front end of said trough, and the rear end of said trough communicating with said outlet flue.

4. In a cooking range, a solid horizontally disposed cooking top and a burner chamber therebeneath, an outlet flue at one side of said chamber, a plurality of elongated horizontally disposed burner arms in said chamber arranged in separated parallel relationship and extending towards said outlet flue, a horizontally disposed trough having an open top positioned in the space between each of said burner arms and substantially coextensive in length with said arms, the bottoms of said troughs being disposed a substantial distance beneath the burner orifices of said burner arms and the open tops of said troughs being closely adjacent but in separated relationship to the under side of said cooking top, the side walls of said troughs extending a substantial distance above the burner orifices of said burner arms, a wall closing the front ends of said troughs, and the rear ends of said troughs communicating with said outlet flue.

5. In a cooking range, a solid cooking top and a burner chamber therebeneath, an outlet flue at the rear of said chamber, a plurality of horizontally disposed troughs in said chamber arranged in spaced parallel relationship and having open upper ends positioned closely adjacent the under side of said top, a plurality of horizontally disposed burner arms in said chamber arranged in spaced parallel relationship, a pair of said burner arms located in the space between the adjacent walls of a pair of said troughs, a single burner arm located along the outer side of each of the remote walls of said troughs said burners having their burner orifices located in a plane between the bottoms and upper ends of said troughs, a secondary air inlet into said chamber at a point below said burner arms, a vertically extending and horizontally elongated secondary air conduit positioned intermediate the pair of burner arms between the troughs, the lower end of said conduit communicating with the burner chamber at a point beneath said burner arms and the upper end of said conduit communicating with the chamber at a point above the burner orifices of said arms, each of said troughs provided with a wall closing its front end, and the rear ends of said troughs communicating with said outlet flue.

6. In a cooking range, a solid cooking top and a burner chamber therebeneath, a plurality of horizontally disposed elongated troughs of substantial depth in said chamber arranged in spaced parallel relationship and having open upper ends positioned closely adjacent the under side of said top, an outlet flue at one side of said chamber, an elongated horizontally disposed burner arm located at each side of each of said troughs, the under side of said top above the spaces between said troughs and the burner arms therein provided with a downwardly extending thickened portion, said thickened portions being substantially coextensive in length with said troughs and burner arms and acting to direct the products of combustion of said burners towards the open tops of said troughs, and the rear ends of said troughs communicating with said outlet flue.

7. In a cooking range, a solid cooking top and a large chamber therebeneath, an outlet flue at the back of said chamber, a secondary air conduit extending from the flue side of the range to the opposite side thereof and dividing said large chamber into a plurality of burner chambers, a plurality of horizontally disposed and elongated troughs of substantial depth in each of said burner chambers arranged in spaced parallel relationship and having open upper ends positioned closely adjacent the under side of said top, one end of said troughs communicating with said outlet flue, an elongated and horizontally disposed burner arm at each side of each trough and provided with burner orifices disposed in a plane intermediate the tops and bottoms of said troughs, a secondary air inlet into the bottom of each of said burner chambers at a point below said burners and troughs, said secondary air conduit communicating with the bottoms of said burner chambers and also communicating with the burner chamber at each of its sides and delivering air thereto above said burner orifices, a by-pass secondary air conduit between those burner arms which are disposed between the troughs, said by-pass conduits communicating with the bottoms of their respective burner chamber and delivering air to the space between the troughs at a point above the burner arm burner orifices, and means at the delivery ends of said by-pass conduits to divide and direct the air discharged therefrom into two oppositely outwardly moving streams.

8. In a cooking range, a solid cooking top and a burner chamber therebeneath, a transversely extending secondary air conduit dividing said burner chamber into a pair of smaller burner chambers, a plurality of horizontally disposed and elongated troughs in each of said burner chambers arranged in separated parallel relationship to each other and to the side walls of said chambers, said troughs having open tops spaced from but adjacent the under side of said top, a plurality of horizontally disposed and elongated burner arms of a length substantially that of said troughs and arranged in separated parallel relationship within said chambers, a pair of said burner arms in each chamber located between the adjacent sides of a pair of troughs and a single burner arm located at the opposite sides of said troughs and between said troughs and side walls of said chambers, the under side of said cooking top plate provided with horizontally elongated fins positioned above and extending downwardly through the open tops of said troughs in spaced relationship to the side walls thereof, additional top carried and horizontally elongated fins extending downwardly between said troughs and positioned above the space between said pairs of burner arms, a secondary air inlet into the bottom of each burner chamber below the burner arms and troughs thereof, said secondary air conduit communicating with the bottoms of said burner chambers and also with the upper portion of said burner chambers at a point above the burner arms, a second secondary air conduit positioned between said pairs of burners and serving to deliver air from the bottoms of said combustion chambers into the top portion thereof at a point between the troughs and also at a point above the pair of burner arms positioned between said troughs, means in the upper ends of said second secondary air conduit for dividing the secondary air flowing therethrough and discharging the same in two oppositely outwardly flowing streams towards said pairs of burner arms and the bottom and upper portions of said burner chambers having communication with one another at points localized about the burner orifices of said burner arms for providing additional secondary air for said burners.

9. In a cooking range, a solid cooking top with a large chamber therebeneath, a secondary air conduit dividing said chamber into a pair of burner chambers, a plurality of horizontally disposed and elongated troughs in each burner chamber arranged in separated parallel relationship and having open tops, a burner arm provided with burner orifices at each side of each of said troughs, secondary air inlets into the bottoms of each burner chamber at a point below said burner arms, air inlets in said conduit into the bottom of each burner chamber and air outlets in said conduit into each burner chamber at a point above the burner orifices of said burner arms, and means restricting further communication between the bottoms of said chambers with the upper portions thereof above the burner arms to points immediately adjacent and about said burner arms and the burner orifices thereof.

WILLIAM H. FRICK.